United States Patent Office 3,407,235
Patented Oct. 22, 1968

3,407,235
MAKING SUBSTITUTED 2,4-DIHYDROXY-
BENZOPHENONES
Hans L. Nufer, Whitehall Borough, Pa., assignor to Pennsylvania Industrial Chemical Corporation, Clairton, Pa., a corporation of Pennsylvania
No Drawing. Continuation-in-part of application Ser. No. 564,014, July 11, 1966. This application Aug. 10, 1967, Ser. No. 659,579
3 Claims. (Cl. 260—591)

ABSTRACT OF THE DISCLOSURE

A 2,4-dihydroxybenzophenone is prepared by passing anhydrous HCl through a slurry of zinc chloride in a solution of resorcinol monobenzoate in an inert solvent while agitating the slurry and heating it to about 120° C. until completion of the Fries rearrangement with production of the benzophenone. The monobenzoate may be prepared by adding benzoyl chloride progressively to a slurry of anhydrous zinc chloride and a solution of resorcinol in an inert solvent at a temperature of 30° to 35° C. while passing a stream of inert gas through it.

---

This invention relates to a method of preparing dihydroxybenzophenones, and this application is a continuation-in-part of my copending application Ser. No. 564,014, filed July 11, 1966, now abandoned.

In this invention the monobenzoate ester of resorcinol or an alkyl substituted resorcinol is treated with zinc chloride and anhydrous hydrogen chloride to convert the ester by the Fries rearrangement to the corresponding benzophenone.

Various procedures have been proposed for the stated purpose but as far as I am aware all of them are objectionable for one reason or another. For instance, they are productive of low yields, or when resorcinol is used as starting material there is a tendency to polymerization or the production of objectionable amounts of tar. Some of these processes involve the initial blocking of the hydroxyl groups of resorcinol or are otherwise undesirably complex and uneconomical.

It is among the objects of this invention to provide a method of making dihydroxybenzophenone and alkyl benzophenones by a Fries rearrangement of the monobenzoate ester of resorcinol and alkyl substituted resorcinol utilizinfi a novel catalyst system, which results in high yields of the desired substituted benzophenones with minimized tar formation, and which is simple and easily performed.

The benzophenones of this invention are of the general structure:

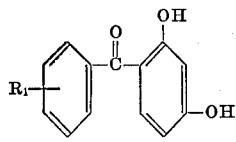

where $R_1$ is H or an alkyl group from $C_1$ to $C_8$ carbon atoms.

Other objects will be recognized from the following specification.

The invention is predicated upon my discovery that the monobenzoate ester of resorcinol undergoes the Fries rearrangement in the presence of zinc chloride-hydrogen chloride catalyst. The monobenzoate ester may be prepared in situ as described in Example 2. When the ester is prepared in this manner a portion of the HCl evolved will complex with $ZnCl_2$ present to form the effective catalyst system of this invention.

Instead of benzoyl chloride there may be used alkyl benzoyl chloride, provided the alkyl group is not in the ortho position.

Various chlorinated solvents may be used in performing the method, the main criteria being inertness to the reagents and the dihydroxybenzophenone, examples being tetrachloroethane and chlorobenzene.

Successful practice of the invention requires the observance of certain critical factors. Thus, the HCl formed during conversion of the resorcinol to its benzoate ester tends to reduce the yield of the desired substituted benzophenone owing to polymerization of resorcinol but I have found that this tendency is suppressed readily by sparging the reaction body to remove the HCl as it is formed, for example by passing a current of an inert gas, such as nitrogen or carbon dioxide, through it. When benzoyl chloride is added to a solution of resorcinol an exothermic reaction occurs and to prevent or minimize tar formation, and for related reasons, it is important to keep the reaction body at a temperature of about 30° to 40° C. during the ester formation. This can be accomplished by regulating the rate of addition of the benzoyl chloride. Although the HCl resulting from the ester formation should be removed substantially as rapidly as it is formed, yet it is also critical to have hydrogen chloride gas present during the ensuing Fries rearrangement. This is accomplished readily by conducting the rearrangement in a closed container and passing HCl gas into it until the substituted benzophenone has been formed during which time the temperature must be controlled to be between about 115° and 130° C. For best results the resorcinol, benzoyl chloride and zinc chloride and HCl should be used in equimolecular proportions although a slight excess of zinc chloride is generally desirable.

The invention may be exemplified by reference to the production of 2,4-dihydroxybenzophenone.

Example 1

A 500 ml. flask is charged with 100 g. resorcinol monobenzoate ester and 70 g. $ZnCl_2$ and monochlorobenzene as a solvent. A stream of anhydrous hydrogen chloride is passed through the reaction mass. The slurry is heated to 120° C. over a one hour period with good agitation. The temperature is maintained at 120° C. for 6 hours while maintaining a continuous flow of HCl. The reaction mass is quenched at 90° C. with water. The resultant chlorobenzene organic phase is washed at 90° C. with water until a pH of 4 is obtained. The chlorobenzene solution is then cooled to 0–5° C., and the slurry is filtered and the cake dried to constant weight to give 88 g. of 2,4-dihydroxybenzophenone of M.P. 142–4° C.

Example 2

A 1.1 flask is charged with 120 g. anhydrous zinc chloride, 88 g. resorcinol and 140 g. monochlorobenzene. To this is added, 120 g. benzoyl chloride over a one hour period at 30–35° C. A stream of inert gas is passed through the system during the benzoyl chloride addition. Upon completion of the addition a stream of anhydrous hydrogen chloride is passed through the reaction mass and the temperature is increased to 120° C. over a one hour period. The temperature is maintained at 120° C. for 6 hours. 2,4-dihydroxybenzophenone is recovered by quenching with water, washing and crystallizing from chlorobenzene. The yield is 147 g. (86%) with a melting range of 142–4° C.

Example 3

Procedure the same as Example 1 except that the Fries rearrangement is performed in a closed vessel with an HCl pressure from 2–40 lbs./in.² The yield is 88 g. of 2,4-dihydroxybenzophenone of M.P. 143–4° C.

Example 4

A 500 ml. flask is charged with 4 g. resorcinol, 60 g. benzoyl chloride, benzoyl chloride, 70 g. zinc chloride, and chlorobenzene. The mixture is heated to 120° C. over 30 minutes and maintained there for 5 hours. The reaction mass is quenched with 200 ml. water at 90° C. and washed with 90° C. water until the pH of the wash water reaches 4. The solution is then cooled to 0–5° C. and the resulting slurry is filtered. The cake is dried to constant weight to give 62 g. (72% yield) of impure 2,4-dihydroxybenzophenone of M.P. 135–8° C.

Example 5

The procedure is the same as Example 1 except that the addition of anhydrous HCl is omitted. Resorcinol monobenzoate is recovered unchanged.

Example 6

The procedure is the same as Example 1 except that the addition of $ZnCl_2$ is omitted. Resorcinol monobenzoate is recovered unchanged.

The residual solvent in these reactions may then be recycled after drying.

The invention is applicable also to the monobenzoate esters of alkyl substituted resorcinol. The products are useful for known uses, e.g. as absorbers of ultra violet radiation.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. A process of making 2,4 - dihydroxy[alkyl]benzophenones having the general structure

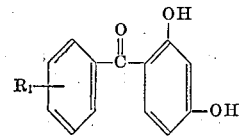

in which $R_1$ is H or an alkyl group from $C_2$ to $C_8$ comprising the steps of contacting the monobenzoate ester of a compound of the group consisting of resorcinol and an alkyl substituted resorcinol with zinc chloride and anhydrous HCl in an inert solvent at a temperature from about 115° to 130° C. and thereby rearranging the compound to said benzophenone, and recovering the benzophenone.

2. A process according to claim 1, the rearrangement being performed in a closed container.

3. A process according to claim 1, the product being 2,4-dihydroxybenzophenone.

No references cited.

DANIEL D. HORWITZ, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,407,235            October 22, 1968

Hans L. Nufer

It is certified that error appears in the above identified patent and that said Letters Patent are hereby corrected as shown below:

Column 3, line 1, "4 g." should read -- 44 g. --. Column 4, line 6, cancel "alkyl".

Signed and sealed this 24th day of February 1970.

(SEAL)
Attest:

Edward M. Fletcher, Jr.            WILLIAM E. SCHUYLER, JR.
Attesting Officer            Commissioner of Patents